March 30, 1926. 1,578,273
H. L. EDWARDS
TREATING APPARATUS FOR CRUDE OIL
Filed March 29, 1924
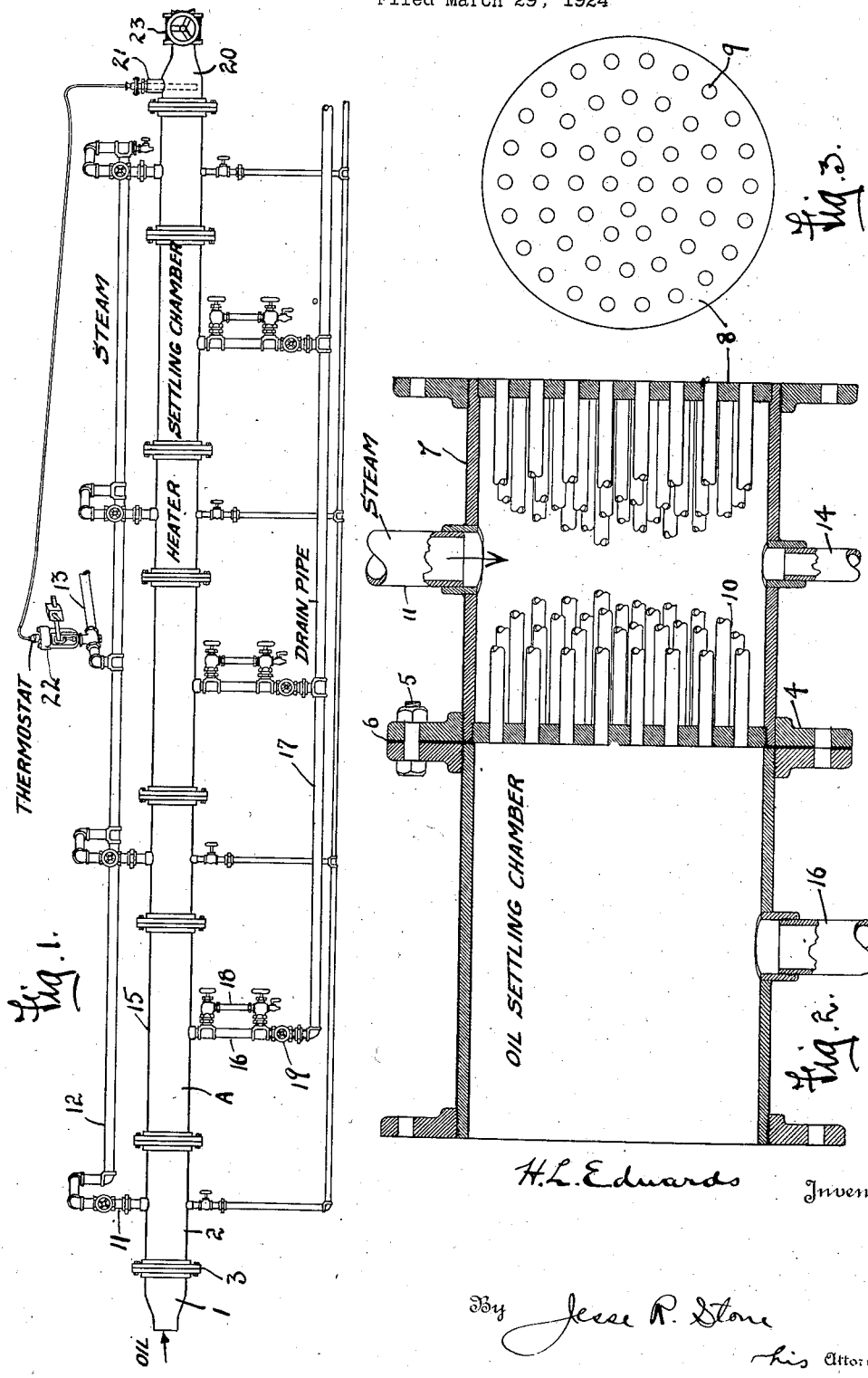

Patented Mar. 30, 1926.

1,578,273

UNITED STATES PATENT OFFICE.

HARRY L. EDWARDS, OF HOUSTON, TEXAS, ASSIGNOR, BY DIRECT AND MESNE ASSIGNMENTS, OF ONE-HALF TO G. H. L. KENT, OF HOUSTON, TEXAS, AND OF ONE-SIXTH TO RAY RICHMOND, OF CORSICANA, TEXAS.

TREATING APPARATUS FOR CRUDE OIL.

Application filed March 29, 1924. Serial No. 702,803.

*To all whom it may concern:*

Be it known that I, HARRY L. EDWARDS, a citizen of the United States, residing at Houston, Texas, have invented a certain new and useful Improvement in Treating Apparatus for Crude Oil, of which the following is a specification.

My invention relates to a continuous apparatus for treating crude oil having impurities therein, such as water, basic sediment, and the like. It contemplates the treatment of crude petroleum as it comes from the well to cause the settling out therefrom of said impurities.

In the production of crude petroleum, the oil frequently comes from the well containing water and basic sediment so finely emulsified with the oil that it will not readily settle out unless treated to separate the impurities from the oil, after which the impurities settle by gravity. The most common way is to heat the oil in tanks causing the impurities to coalesce and settle and then drawing off the oil. This requires an expensive equipment, and must be run intermittently, the plant being idle while the oil is being run off and refilled after settling out of the water and other foreign substances.

It is an object of the invention to provide a simple and inexpensive apparatus for treating crude oil which may be worked continuously. It is also desired to so arrange the apparatus that the operation will be automatically regulated.

It is also an object to so arrange the apparatus that the oil may be placed under pressure to assist in the dehydrating of the oil.

In carrying out my invention I employ an installation illustrated in the accompanying drawing in which Fig. 1 shows a side elevation thereof. Fig. 2 is a central vertical section through a position of the treating pipe; and Fig. 3 is a front elevation of a head plate employed in the heating section.

Like numerals of reference are employed to designate like parts in all the views.

The oil to be treated is obtained from storage tanks or direct from the wells. It is contemplated that the oil as it is pumped from the well may be dehydrated on its way to the pipe line. In such case the flow pipe from the well will be connected to one end of a pipe of larger diameter having sections therein in which the oil is heated sufficiently to cause the water and basic sediment to separate out.

In Fig. 1 is shown a treating pipe A made up of alternate heating and settling sections. The flow pipe from the well may be connected within the open swedged end 1 of the pipe A. This end is connected to a heating section 2 by flanged plates or collars as shown at 3. The construction of these couplings is shown in Fig. 2; each section is screwed within a short flanged collar 4, the flanges of adjacent collars being perforated to receive bolts 5 by means of which they are secured together. Packing is placed between said collars as shown at 6 to assist in preventing leakage at the joints.

The heating section 2 is of the internal construction shown at 7 in Fig. 2. It has head plates 8 formed in each end. Said plates may be welded or shrunk in place so as to form, in effect, an integral part of the section. Said plates are formed with numerous openings 9 therein, said openings being aligned with openings in the plate at the other end so as to receive tubes 10 extending longitudinally of the heating section and swedged or otherwise secured in fluid tight relation with the head plates.

The section 7 outside said tubes forms a chamber to receive some heating medium, such as steam which may be conducted thereto through pipe 11 in the upper side of the heating section. This pipe is a branch of a steam line 12, and 13 leading from a boiler or other source of supply. A smaller outlet pipe 14 is connected with the lower side of the section to carry off the condensed steam.

Connected with the heating section is a settling section 15 which has no obstructions therein but furnishes a chamber in which the heated oil may separate out the water and sediment. An outlet pipe 16 on the lower side allows a means to drain off such impurities. Said pipe 16 connects with a drain pipe 17 which conducts off the waste. A sight glass 18 is preferably connected with the pipe 16 as shown in Fig. 1 so as to determine if oil is passing out with the waste. The valve 19 in the pipe allows the rate of flow to be regulated so that no oil will be run off with the impurities.

The apparatus is made up of alternate heating sections 2 and settling sections 15 and as many sections will be employed as found expedient in the particular installation considered. The heating sections are preferably somewhat shorter than the settling sections. In the particular installation shown, I have employed four heating and three settling sections. A swedged outlet nipple 20 on the last section of the series may be connected with a pipe line, or may discharge into storage as desired.

To accomplish the automatic regulation of the heat to which the crude oil is subjected, a thermometer is inserted into the outlet nipple 20 through a branching tube 21 thereon. This thermometer is connected with a thermostatic valve control member 22 of standard construction connected in the steam line 13. Said control is set so that the temperature of the oil may be retained within the desired limits. When the oil is not hot enough more steam will be supplied and when the temperature is excessively high, steam will be turned off somewhat.

A valve 23 at the end of the treating pipe A allows the flow to be restricted so as to increase the fluid pressure inside the pipe due to the pumps. This increase of pressure assists in the separation of the said impurities from the oil and may be employed where obstinate emulsions are encountered, not yielding to ordinary treatment.

The operation of the device will now be clear. The oil is heated in flowing through the heating sections and the impurities settle out in the passage of the mixture through the settling sections. As the water and basic sediment settle in the pipe, they are drawn off through the outlet pipes 16, 17 to the waste. The heat of the oil increases in its passage through successive heating sections until it passes from the treating pipe and on discharge, will be free of impurities. If necessity arises the pressure may be increased in the pipe by regulating the valve 23 as described. Due to the thermostatic control of the steam supply the device will need very little attention and will be continuous.

Further objects and advantages will be apparent to one skilled in the art without further description.

What I claim as new and desire to protect by Letters Patent is:

1. A dehydrator for crude oil comprising a horizontally arranged pipe having reduced openings at each end, alternate heating and settling sections in said pipe, the passage of oil through said heating sections being more constricted than in said settling sections, means to draw off impurities from said settling sections, and means connected with the outlet from said pipe to regulate the pressure of fluid therein.

2. In a dehydrator for crude oil including a pipe through which oil may be conducted, said pipe being arranged approximately horizontally, alternate heating and settling sections in said pipe, said heating sections comprising oil tubes extending through a chamber, means to supply a heating medium to each of said chambers, and automatic means to control the amount of said heating medium.

3. In a dehydrator for crude oil, an approximately horizontal oil conducting pipe, heating sections therein, said sections being closed transversely except for oil tubes extending longitudinally therethrough, a pipe for heating fluid connected to said sections, other sections between said heating sections being unobstructed to allow settling out of the water and having liquid outlets on the lower side thereof.

4. A dehydrator for crude oil comprising an oil conducting pipe, alternate heating and settling sections therein, means to conduct a fluid heating medium to said heating sections, adjustable means in said settling sections to draw off impurities settling from said oil, automatic means to regulate the amount of heat supplied to said heating sections, and means to regulate the fluid pressure in said oil conducting pipe.

In testimony whereof I hereunto affix my signature this 25th day of March, A. D. 1924.

HARRY L. EDWARDS.